STATIC SWITCHING SELF-REGULATING TRANSFORMER SYSTEM

Filed April 13, 1966 7 Sheets-Sheet 1

Inventor,
Donald A. Paynter,
by Francis K. Doyle
His Attorney.

STATIC SWITCHING SELF-REGULATING TRANSFORMER SYSTEM

Filed April 13, 1966 7 Sheets-Sheet 2

Inventor,
Donald A. Paynter,
by Francis K. Doyle
His Attorney.

STATIC SWITCHING SELF-REGULATING TRANSFORMER SYSTEM

Filed April 13, 1966 7 Sheets-Sheet 3

Inventor,
Donald H. Paynter,
by Francis X. Doyle
His Attorney.

STATIC SWITCHING SELF-REGULATING TRANSFORMER SYSTEM

Filed April 13, 1966 7 Sheets-Sheet 4

Inventor,
Donald A. Paynter,
by Francis K. Doyle
His Attorney.

STATIC SWITCHING SELF-REGULATING TRANSFORMER SYSTEM

Inventor,
Donald A. Paynter,
by Francis K. Doyle
His Attorney.

STATIC SWITCHING SELF-REGULATING TRANSFORMER SYSTEM

Filed April 13, 1966 7 Sheets-Sheet 6

Inventor,
Donald A. Paynter,
by Francis V. Doyle
His Attorney.

| TAP IN USE | OUTPUT DIODE MATRIX INPUT | | | | STATE OF REVERSIBLE COUNTER 60 | | | | SECONDARY VOLTAGE | | CORRECTION FLIP-FLOP RESPONSES | | | | SIGNAL THRU INPUT DIODE MATRIX | REVISED STATE OF REVERSIBLE COUNTER 60 | | | | OUTPUT DIODE MATRIX OUTPUT | | | | NEW TAP IN USE |
|---|---|---|---|---|---|---|---|---|---|---|---|---|---|---|---|---|---|---|---|---|---|---|---|---|
| | 61 | 62 | 63 | 64 | 222 | 226 | 222' | 226' | HIGH 44(t) | LOW 43(t) | 46 | 47 | 48 | 49 | | 222 | 226 | 222' | 226' | 70 | 71 | 72 | 73 | |
| 80 | 0 | -E | 0 | -E | C | NC | C | NC | + | | -E | 0 | | -E | YES | NC | C | C | NC | -E | 0 | 0 | -E | 81 |
| 80 | 0 | -E | 0 | -E | C | NC | C | NC | | + | 0 | -E | -E | | NO | → | | | | | | | | 80 |
| 81 | -E | 0 | 0 | -E | NC | C | C | NC | + | | -E | 0 | | -E | YES | C | NC | NC | C | 0 | -E | -E | 0 | 82 |
| 81 | -E | 0 | 0 | -E | NC | C | C | NC | | + | 0 | -E | -E | | YES | C | NC | C | NC | 0 | -E | 0 | -E | 80 |
| 82 | 0 | -E | -E | 0 | C | NC | NC | C | + | | -E | 0 | | -E | YES | NC | C | NC | C | -E | 0 | -E | 0 | 83 |
| 82 | 0 | -E | -E | 0 | C | NC | NC | C | | + | 0 | -E | -E | | YES | NC | C | C | NC | -E | 0 | 0 | -E | 81 |
| 83 | -E | 0 | -E | 0 | NC | C | NC | C | + | | -E | 0 | | -E | NO | → | | | | | | | | 83 |
| 83 | -E | 0 | -E | 0 | NC | C | NC | C | | + | 0 | -E | -E | | YES | C | NC | NC | C | 0 | -E | -E | 0 | 82 |

C = CONDUCTING
NC = NON-CONDUCTING

Fig. 11.

Inventor,
Donald A. Paynter
by Francis K. Doyle
His Attorney.

United States Patent Office 3,388,319
Patented June 11, 1968

3,388,319
STATIC SWITCHING SELF-REGULATING TRANSFORMER SYSTEM
Donald A. Paynter, Goleta, Calif., assignor to General Electric Company, a corporation of New York
Filed Apr. 13, 1966, Ser. No. 542,332
19 Claims. (Cl. 323—43.5)

This invention generally relates to static switching systems and more specifically to such systems for regulating a transformer output at a substantially constant voltage.

In the prior art power transformer voltage regulation has generally been controlled by mechanical tap switches which varied the number of primary or secondary turns and the output voltage. However, mechanical tap switches have several disadvantages including: slow switching action; loss of reliability after extensive use, requirements for arc prevention and suppression systems such as immersing the tap switches in oil; and increased system size.

Notwithstanding these disadvantages, mechanical tap changing systems have been used because other adequate means have not been available at relatively high power levels. With the advent of semi-conductor devices having high current capabilities, several efforts have been made to produce a solid state static tap switching system, and several systems have been proposed which utilize static switching. For example, one such system utilizes a plurality of silicon controlled rectifier circuits which are individually connected in series with a plurality of taps in an autotransformer. As the effectiveness of this system depends upon full-wave conduction through the tap switch, the cost of the number of required silicon control rectifiers and associated control equipment can become prohibitive at high power levels.

Another proposed circuit includes a transformer having a plurality of secondaries interconnected by solid state switching devices so that each successive secondary produces a voltage in a binary ratio. Each secondary is connected in series with one of a plurality of solid state switching circuits to form a voltage source circuit. Another group of these solid state switching circuits are connected in series with a main secondary, and one voltage source circuit is connected in parallel with each series solid state switching circuit. The output voltage is thereby controlled by the combination of voltage source circuits which are energized in the output circuit.

Switch control is provided by a pulse generator which is quasi-synchronous with line frequency, a saturable transformer, a trigger and gate. Zero current is sensed by desaturation of the saturable transformer which permits pulses to be applied to one gate input by a filter means to fire the trigger circuit coincidently in time with the pulse generator which provides pulses for the other gate. Time delay means in the filter means are used to ensure trigger actuation on the second incoming pulse so that trigger switchover to a non-pulse producing state always lags zero current in the switching device.

This combination of a saturable transformer and time delay provides a zero current indication which is dependent upon both the magnitude and phase of the applied voltages and current. Saturation of a core presents core problems because there can be a phase shift at the decision point, or the zero current point, which can cause an error which approaches five degrees from zero current. In high power applications a one degree phase shift is generally all that is acceptable if solid state devices are to be used, so this system would generally not be accurate enough for such an application.

Another disadvantage is that more than one switching device conducts simultaneously at any given setting because either the device which switches in a secondary conducts or the shorting switching device conducts. Multiple switching device conduction can cause bothersome heating in high power applications so that some special cooling arrangement may be necessary to protect the solid state devices.

A transformer using switching as above described is disclosed in an article published in Control Engineering of January, 1964 at pages 84 through 86.

It is an object of this invention to provide a self-regulating transformer which includes static switching circuitry to thereby eliminate the requirement of mechanical switching systems.

Another object of this invention is to provide a self-regulating transformer switching system wherein only one static switching element conducts load current at a given setting so that the heat production by the static swiching elements is reduced.

Still another object of this invention is to provide a static switching circuit for a self-regulating transformer wherein the switching occurs when the current through the switching devices is substantially zero.

Yet a further object of this invention is to provide a solid state switching device for a self-regulating transformer which can be adapted for use on standard tapped transformers as a substitute for conventional mechanical tap changing equipment.

A further object of this invention is to provide a self-regulating transformer which permits a reduction in the number of components as contrasted to prior art devices.

Still a further object of this invention is to provide a self-regulating transformer wherein the phase shift from the zero current sensing point is miminized over a wide range of operating currents.

Yet another object of this invention is to provide an arcless tap changing system to thereby eliminate the requirements for arc extinguishing or arc suppression components normally associated with conventional tap changing systems.

Briefly stated, a static switching self-regulating transformer utilizing the present invention comprises plural signal producing and comparing means for generating a reference voltage signal and a signal indicative of secondary voltage. A difference between these signals is indicated by two qualitative signals representing an error and the direction of the error. One signal is compared with a condition indicating signal to ascertain if further correction is permissible. If correction is permissible, an indication thereof is combined with static switch zero current pulses to initiate switching at the optimum switching period of zero current. This indication signal and the other error direction signal are combined to cause a change in the tap switch conditions to reduce the error. These steps are repeated either until the error is reduced to tolerable limits or until no additional correction can be made.

This invention is pointed out with particularity and distinctness in the appended claims. The aforementioned and further objects, advantages and features of this invention can be more fully appreciated by reference to the following detailed description of a self-regulating transformer system taken in conjunction with the accompanying drawings wherein similar elements appearing in the various drawings have been designated by the same numeral and wherein:

FIGURE 1 schematically represents a static switching self-regulating transformer to show the interconnection between particular circuits which are more fully described with reference to FIGS. 2 through 10;

FIGURE 2 schematically illustrates a voltage sensing network which can be utilized in a transformer regulator utilizing this invention;

FIGURE 3 illustrates an amplifier and correction flip-flop circuit which can be connected to the sensor shown in FIG. 2 to amplify the sensor circuit output and produce error signals;

FIGURE 4 schematically illustrates an input diode matrix which is connected to the output of the circuit shown in FIG. 3 to ascertain if further correction is permissible;

Figure 1:
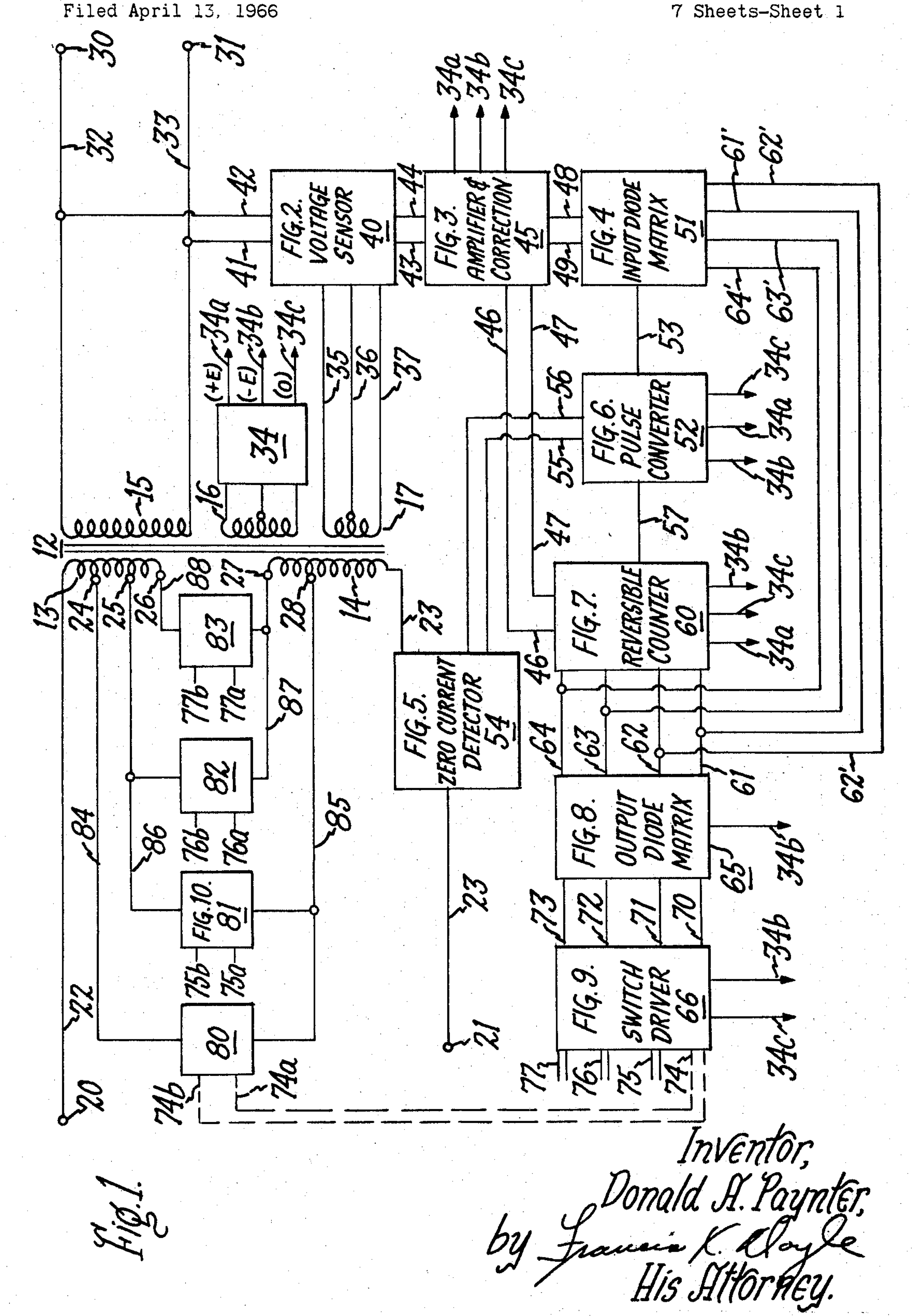
Figure 10:
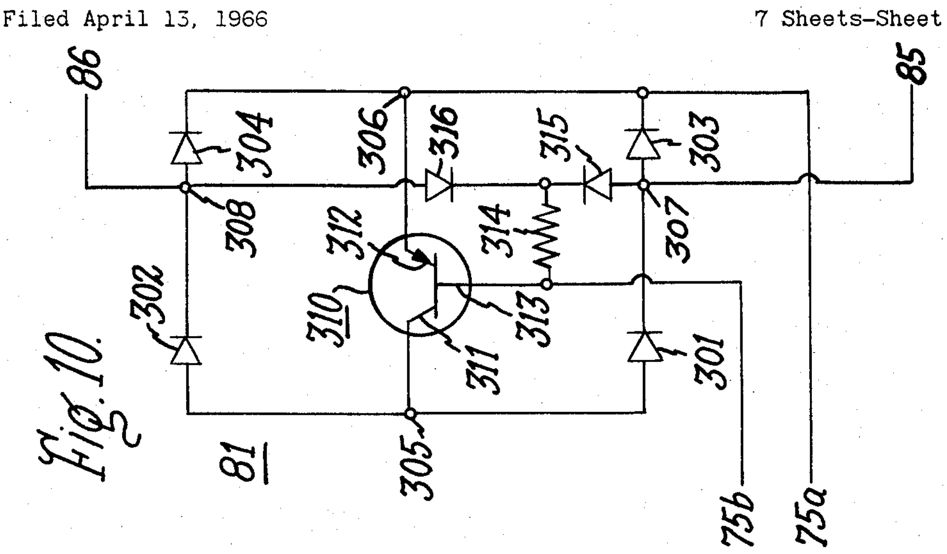
Figure 8:
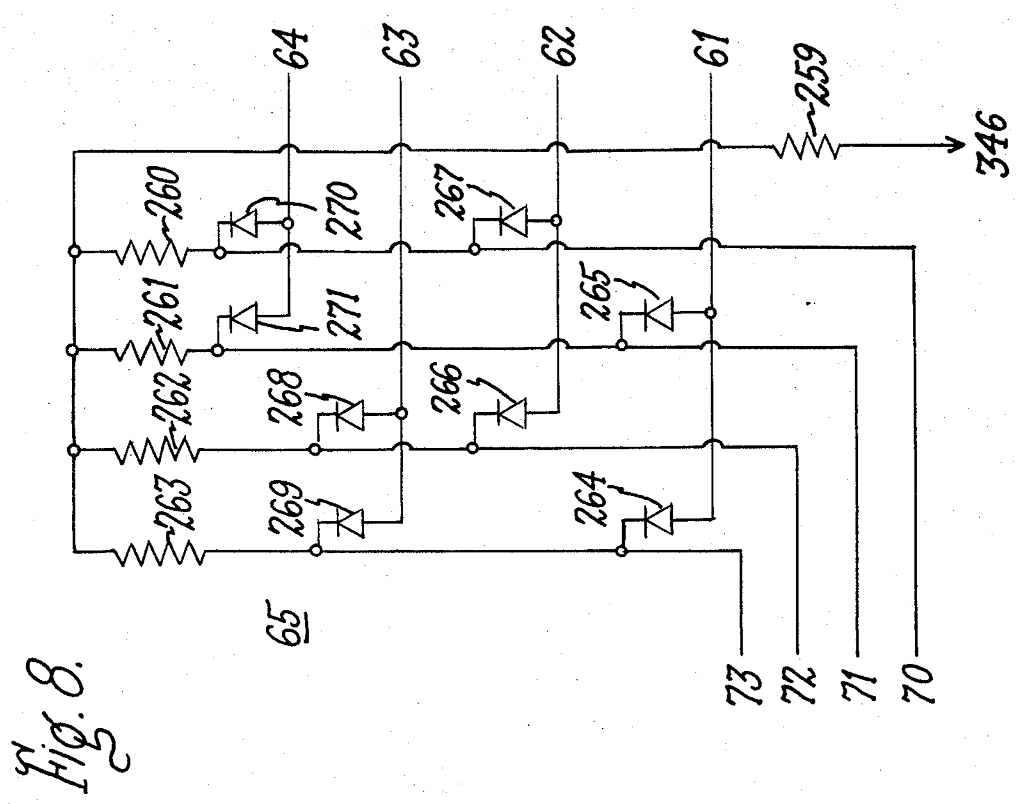
FIGURE 8 illustrates an output diode matrix which converts a signal from the reversible counter shown in FIG. 7 to a single input signal.
Figure 9:
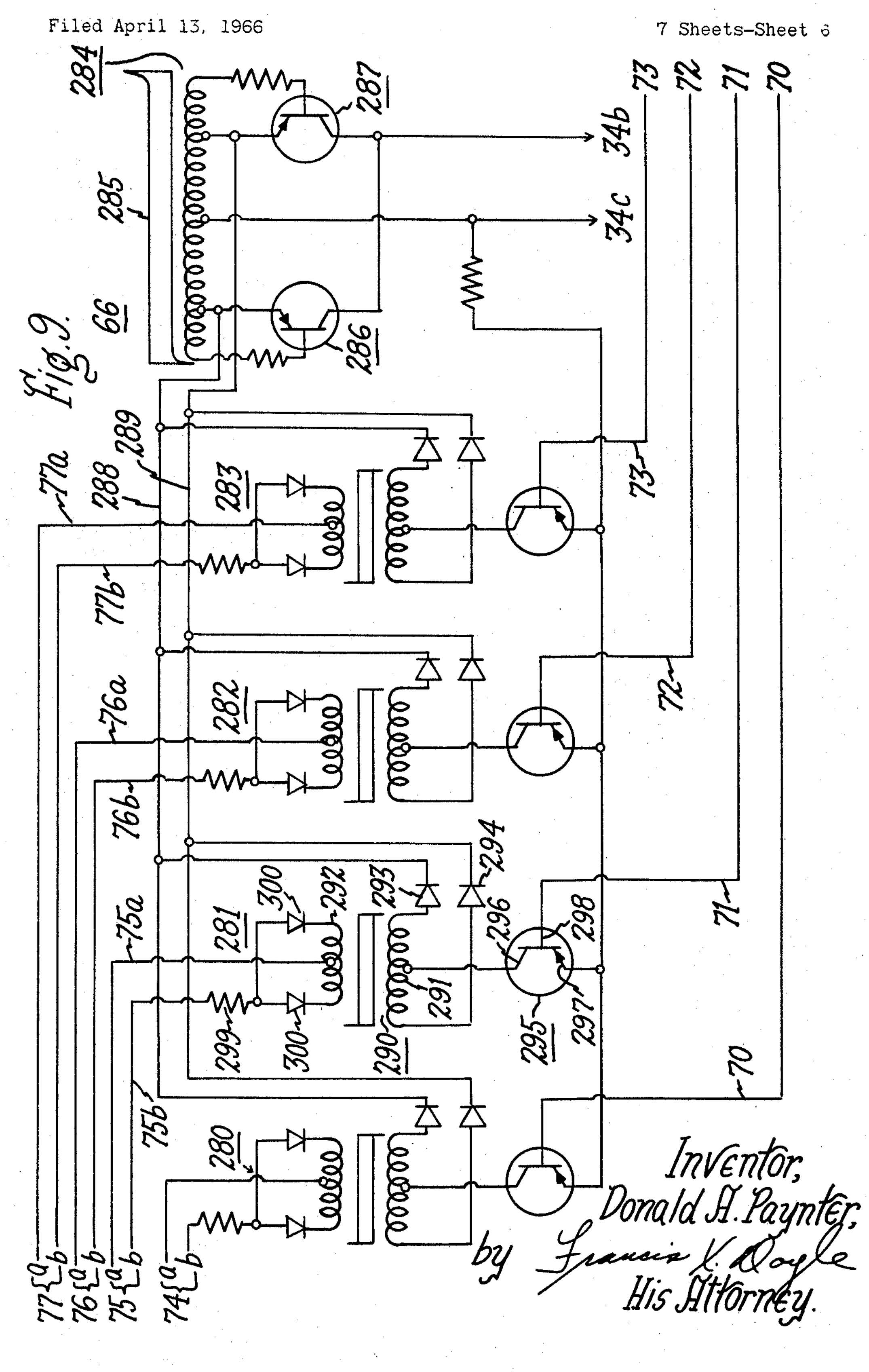

FIGURE 9 schematically represents a plurality of switch driver units which utilize the output signal from the output diode matrix of FIG. 8 to initiate one tap switch by raising the output diode matrix signal to a usable level;

FIG. 10 illustrates one embodiment of a switching unit which is responsive to the switch driver unit shown in FIG. 9 and which is connected between various taps on the transformer; and FIGURE 11 presents a chart to shown the operation of a self-regulating transformer system such as shown in FIG. 1 under all conditions with reference to particular components in the circuits described in FIGS. 1 through 10.

The system shown in FIG. 1 is adapted to be used with a transformer 12 having two parallel primary windings 13 and 14, a main secondary winding 15 and two auxiliary secondary windings 16 and 17. Primary windings 13 and 14 are connected to input terminals 20 and 21 by primary line conductors 22 and 23 and are interconnected by a tap switching network connected between taps 24, 25 and 26 on primary winding 13 and taps 27 and 28 on primary winding 14 in a standard configuration. The particular number of taps chosen for purposes of this description is merely convenient; it should be obvious to those skilled in the art that the design considerations of any particular application are determinative of the number of taps to be used.

Power from main secondary winding 15 is coupled to output terminals 30 and 31 by conductors 32 and 33 respectively. First auxiliary winding 16 serves as a power source for a bias producing network 34 which produces positive, negative and zero voltage biases (+E), (−E) and (0) at terminals 34*a*, 34*b* and 34*c* respectively to be coupled to other components in the system. Second auxiliary winding 17 is center-tapped and is coupled by conductors 35, 36 and 37 to a voltage sensor circuit 40. Voltage sensor circuit 40 is additionally coupled by conductors 41 and 42 to transformer secondary 15 to monitor the output voltage therefrom.

The voltage inputs transferred to voltage sensor circuit 40 from secondary 15 and from second auxiliary secondary winding 17 are compared to produce a correction signal either at conductor 44 or conductor 43 when the voltage at output terminals 30 and 31 either exceeds or is less than the reference voltage. Amplifier and correction flip-flop circuit 45, connected to voltage sensor circuit 40 by conductors 43 and 44, generates a plurality of signals indicative of the error and its direction at output conductors 46, 47, 48 and 49. Signals on output conductors 48 and 49 are applied to an input diode matrix 51 to produce a pulse initiation signal coupled to a pulse generator 52 by conductor 53 when error correction can be obtained.

This pulse initiation signal and pulses from a zero current detecting circuit 54 coupled to pulse generator 52 by conductors 55 and 56 are added in pulse generator 52. After a predetermined interval druing which the error persists, the pulse generator 52 produces a counting pulse which is coupled through conductor 57 to a reversible counter 60. Pulses transmitted to reversible counter 60 cause the counter to step in one of two directions until a maximum or minimum count is reached. Count direction in reversible counter 60 is determined by the signals produced by amplifier and correction flip-flop circuit 45 on conductors 46 and 47.

When the state of reversible counter 60 is changed, an output, which previously appeared on conductors 61, 62, 63 or 64, shifts. Each conductor is connected to an output diode matrix 65 and back to input diode matrix 51 by a feedback loop comprising conductors 61′, 62′, 63′, and 64′. This feedback loop causes input diode matrix 51 to assume a state which blocks further correction whenever the maximum or minimum limit of counter excursion is reached. Output diode matrix 65 converts the signals on conductors 61 through 64 to a single signal to bias switch driver circuit 66 through conductors 70, 71, 72 or 73 so that a signal on one of these conductors causes an output to be produced at one of a plurality of conductor pairs 74, 75, 76 or 77. A signal at one pair energizes an associated top switching circuit 80, 81, 82 or 83 which is adjacent a formerly conducting tap switching circuit. For example, conductor 84 connects one side of tap switch 80 to tap 24 while conductor 85 connects the other side of tap switch 80 together with one side of tap switch 81 to tap 28. A conductor 86 serves to connect the other side of tap switch 81 and one side of tap switch 82 to tap 25. The other side of tap switch 82 and one side of tap switch 83 are connected to tap 27 by conductor 87. Finally conductor 88 interconnects the other side of tap switch 83 to tap 26.

If it is assumed that a predetermined output voltage is obtained when tap switch 81 is closed, a change in the secondary voltage is detected by voltage sensor circuit 40 and converted to two signals by amplifier and correction flip-flop circuit 45. One of these signals appears as a potential at either conductor 48 or 49 and is applied to input diode matrix 51. The other, a bipolar signal at conductors 46 and 47, is applied to reversible counter 60 to establish the direction of a subsequent count. So long as switch 81 is conducting and the error persists, a negative signal appears at conductor 53 because correction in either direction is permissible. After a predetermined time delay, pulse generator 52 is energized by a steady state potential applied to conductor 53. If switch 83 had been activated when the error occurred, no further correction could have taken place to decrease the output voltage, and the feedback from reversible counter 60 to input diode matrix 51 would have blocked activation of pulse generator 52.

The pulse produced by pulse generator 52 occurs when pulse generator 52 is additionally energized by zero current sensor 54 to advance the counter state by one. Depending upon the polarity of the signals applied from amplifier and correction flip-flop circuit 45, the signal previously present at conductor 71 shifts either to conductor 70 or to conductor 72 as a function of the plurality of signals in a particular combination generated by reversible counter 60. In turn, the signal shift causes tap switch 81 to open and either tap switch 80 or tap switch 82 to close to vary the number of primary turns.

If the output voltage error were still to exceed acceptable regulation, an additional pulse could be produced by the action of voltage sensor 40, amplifier and correction flip-flop circuit 54, input diode matrix 51 and zero current sensor 54 to shift the tap from tap switch 82 to tap switch 83. No additional correction could be made for such voltage error if tap switch 80 had been energized, however.

This system can be constituted by several known circuits to perform the various functions of the individual circuits in the system. However, a still better understanding of the operation of a self-regulating transformer system can be realized by the following description of preferred circuit details for the various individual circuits which constitute such a system. Therefore, a detailed description will be given for the voltage sensor circuit 40, amplifier and correction flip-flop circuit 45, input diode matrix 51, zero current sensor 54, pulse generator 52, reversible counter 60, output diode matrix 65, switch driver unit 66 and tap switches 80 through 83.

Figure 2:
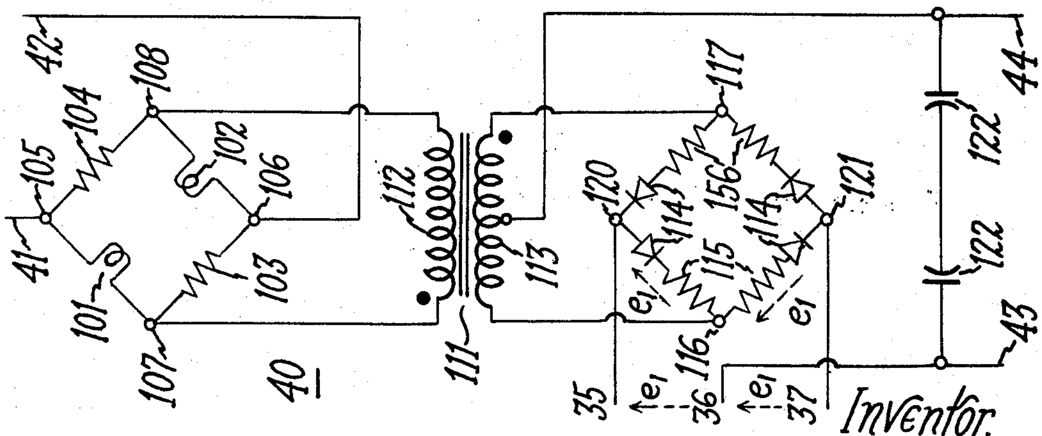

*Voltage sensor cricuit 40—FIG. 2*

The voltage sensor circuit 40, shown in FIG. 2 is constituted by a lamp bridge network and a phase sensitive detector network which, in combination, produce an output signal when the secondary voltage varies from a normal value. Included in the lamp bridge network are first and second lamps 101 and 102 and resistors 103 and 104 which are connected in an alternate series loop. Conductors 41 and 42 are connected to input junctions 105 and 106 formed by lamp 101 and resistor 104 and by lamp 102 and resistor 103. The remaining bridge junctions constitute output junctions 107 and 108. Coupling transformer 111 is energized by any voltage appearing at output junctions 107 and 108 by connecting primary 112 thereto. Resistors 103 and 104 are chosen so that at the normal secondary voltage no fundamental frequency error voltage appears across output terminals 107 and 108 to energize coupling transformer 111.

A lamp bridge voltage level detector functions by virtue of the fact that the resistance of a tungsten filament varies as an exponential power of the applied voltage. So, the bridge resistance arms are in balance for only one input voltage level. At other input levels there will be an error signal of fundamental frequency whose instantaneous polarity, with respect to the input, will shift 180 degrees depending on whether the error is an overvoltage or an undervoltage.

Unfortunately, the thin filaments will heat and cool slightly with the alternating sine current, producing considerable spurious harmonic signals at terminals 107 and 108, and this harmonic residue tends to obscure the true null level. It is the purpose of the phase sensitive detector network, consisting of a plurality of diodes 114 and resistors 115, to behave as a synchronous switch which will attenuate all signal voltages except the sine error signal of fundamental frequency, which can have only the two instantaneous relative polarities and with no intermediate phase position. The phase sensitive detector will also full-wave rectify this error signal and the resulting polarity will depend on the error being above or below normal.

Considering an output voltage which is normal, the auxiliary secondary winding 17 (FIG. 1) will supply a voltage sufficient to cause adjacent pairs of diodes 114 to fire simultaneously on each half-cycle, the pairs alternating with each half cycle polarity. Thus, voltages of some magnitude will build up on resistors 115. These voltages should be balanced to terminals 116 and 117, and hence no offset voltage should appear between conductors 43 and 44. Harmonic voltages, appearing at terminals 116 and 117 however, will interfere with the simultaneous firing of diodes 114 and some output current will be experienced along conductors 43 and 44. But this resulting current will be attenuated and chopped up, since it is not in continuous phase agreement with the switching signal from auxiliary winding 17. This signal will be further attenuated by the shunt capacitors 122.

When the output voltage departs from normal, there will also be a fundamental frequency voltage appearing across terminals 116 and 117 by way of coupling transformer winding 113. This voltage will be in step with the switching voltage from auxiliary winding 17, but their instantaneous polarities will either be alike or 180 degrees out of step. The result will be that the firing of diodes 114 will be advanced and retarded as one proceeds around the ring, and the resulting voltage missmatches on resistors 115 will drive a well defined unidirectional signal current along conductors 43 and 44 and their connected load (not shown in FIG. 2). Tho polarity of this current will, as described, be determined by whether the output voltage is higher or lower than the normal level. The phase sensitive detector has therefore served to attenuate spurious harmonic error signals and to convert a true sinusoidal error voltage into a polarized error signal current.

Therefore, voltage sensor circuit 40 produces a positive signal at conductor 43 or conductor 44 which is indicative of a decrease or an increase of the voltage at main secondary winding 15. Difference amplifier networks and networks using light sources with an output dependent upon transformer output voltage coupled to a photocell-Zener diode detector are examples of other voltage sensor circuits which could be used to sense voltage variations and produce a signal indicating the direction of that error.

Figure 3:
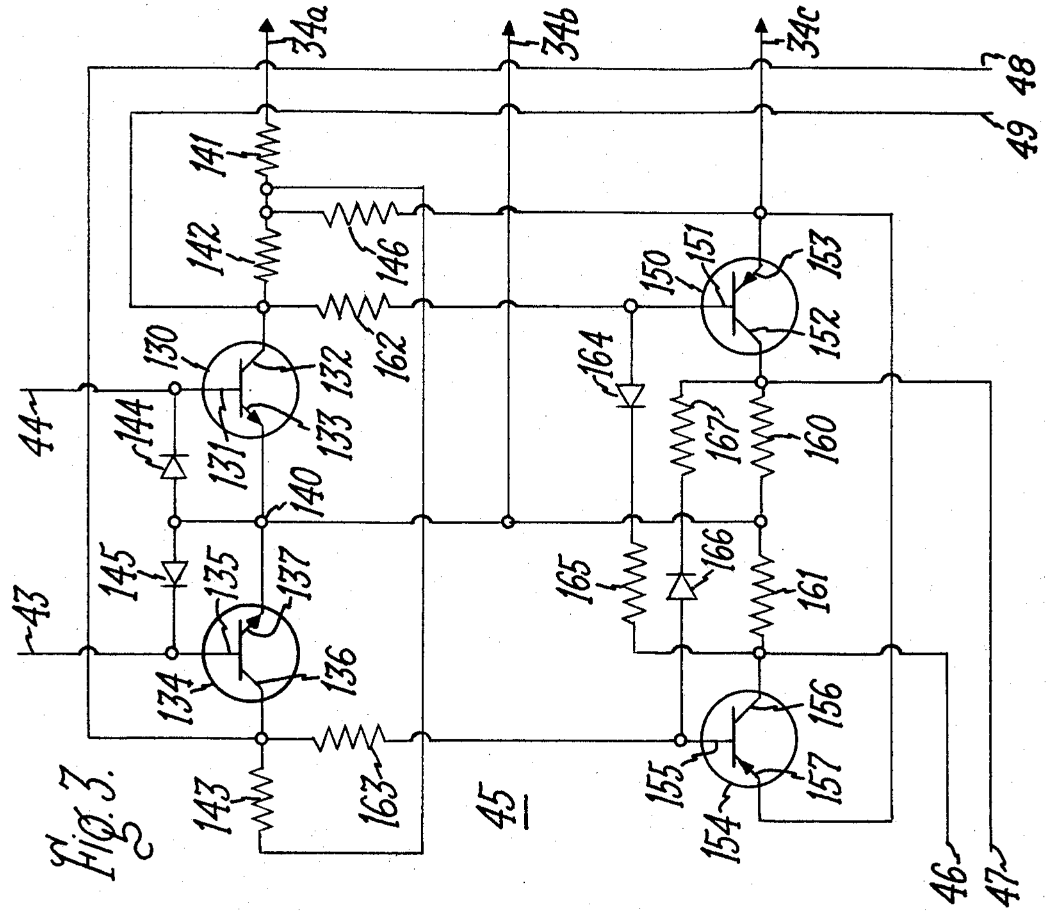

*Amplifier and correction flip-flop circuit 45—FIG. 3*

FIGURE 3 schematically represents an amplifier and correction flip-flop circuit 45 which comprises a direct current amplifier and a bistable flip-flop circuit.

The direct current amplifier generally comprises two transistors and two rectifiers connected in a bridge-amplifier circuit. An NPN transistor 130, having a base 131, a collector 132 and an emitter 133, and an NPN transistor 134 having a base 135, a collector 136 and an emitter 137, constitute the direct current amplifier with emitters 133 and 137 being connected to a common junction 140. Negative bias is applied to junction 140 from terminal **34*b* of bias producing network 34. Positive bias is applied to collectors 132 and 136 by a common resistor 141 connected to terminal 34*a* and both resistors 142 and 143 which are individually in series between one of the collectors 132 and 136 and resistor 141. A diode 144 is provided to conduct current from common junction 140 to base 131 and another diode 145 conducts from common junction 140 to base 135 to form a full-wave bridge rectifier with the base-emitter diodes of transistors 130 and 134. The amplifier circuit is completed by coupling the junction formed by resistors 141 and 142 to terminal 34*c* by a resistor 146, by coupling bases 131 and 135 to conductors 44 and 43 and by coupling collectors 132 and 136 to conductors 49 and 48**.

If conductor 44 is biased in a positive direction, a direct current path exists which includes base 131, emitter 133, common junction 140 and rectifier 145; transistor 130 turns on. The potential at collector 132 and conductor 49 drops to (—E) which is the potential at junction 140; while collector 136 remains at substantially zero potential. Conversely, if the positive signal appears at conductor 43, conductor 48 goes to (—E) potential.

In addition to being brought out of the circuit by conductors 48 and 49 during a time period of error, the collector voltages are also coupled to the bistable flip-flop shown as comprising a PNP transistor 150 having a base 151, a collector 152 and an emitter 153, and a PNP transistor 154, having a base 155, a collector 156 and an emitter 157. Emitters 153 and 157 are both connected to the zero bias source terminal **34*c* while collectors 152 and 156 are connected to the (—E) bias source terminal 34*b* by resistors 160 and 161. Signals at collectors 132 and 136 are coupled to bases 151 and 155 by resistors 162 and 163. Bistable operation is provided by latching diode networks interconnecting transistors 150 and 154. Diode 164 and resistor 165 are placed in series to conduct from base 151 to collector 156, and diode 166 and resistor 167 similarly couple base 155 to collector 152**.

When transistor 130 is turned on, base 151 drops to (—E) and transistor 150 turns on causing collector 152 and conductor 47, connected thereto, to go to zero potential. When the signal at 44 is removed and collector 132 returns to zero potential, a current is still conducted from collector 132 through resistors 162, 165 and 161 and diode 164 to the (−E) bias source terminal 34*b* to latch on transistor 150 and maintain a bipolar signal at conductors 46 and 47. If a positive signal is applied to conductor 43, base 155 is driven negative so that transistor 154 conducts. Diode 166 blocks current from flowing from collector 152, which is at zero potential. As collector 156 goes to zero, base 151 is driven to zero and turns off transistor 150. This change in conduction causes the bipolar signal at conductors 46 and 47 to reverse until another change in input occurs because transistor 154 is latched on by the network comprising resistors 163, 167 and 160 and diode 166.

If the voltage sensor 40 senses a change from a predetermined value which causes a positive signal to appear at conductor 44, two output signals are obtained: a signal of (−E) at conductor 49 which persists during the error, and a bipolar signal of (−E) and zero at conductors 46 and 47 which continues until a positive signal appears at conductor 43. Upon the application of a signal indicating a reverse error, the (−E) signal appears at conductor 48 and the bipolar signal reverses.

Figure 4:
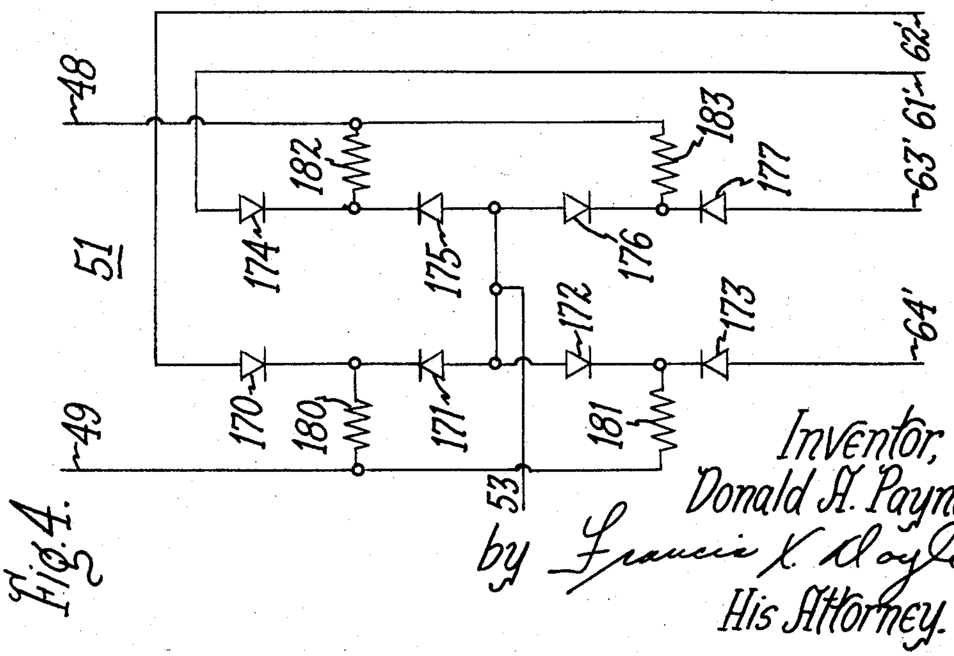

*Input diode matrix 51—FIG. 4*

Input diode matrix 51 produces a negative direct current output pulse for energizing pulse generator 52 when reversible counter 60 is not at an extreme count in either direction. Whether or not reversible counter 60 is at such an extreme count, indicating that the maximum or minimum tap position has been reached, is determined by the signal pattern produced by reversible counter 60 and applied to conductors 61′, 62′, 63′ and 64′ which are connected to input diode matrix 51.

Two series circuits of alternately poled diodes, with diodes 170, 171, 172 and 173 disposed between conductors 62′ and 64′ and diodes 174, 175, 176, and 177 disposed between conductors 61′ and 63′, form the input diode matrix. Anodes of diodes 170 and 173 are connected to conductors 62′ and 64′ respectively with the common cathode junctions in this series circuit being coupled in parallel to conductor 49 by resistors 180 and 181 and with the common anode junction of diodes 171, 172 connected to conductor 53. Diodes 174 through 177 are similarly disposed between conductors 61′ and 63′ with the common cathode junctions being coupled to conductor 48 by resistors 182 and 183 and the common anode junction being connected to conductor 53. Conductor 53 is thereby coupled to both common anode junctions and is sensitive to some negative signals to energize pules generator 52.

If a zero signal is applied to both conductors 61′ and 63′ simultaneously, both diodes 174 and 177 are forward biased and negative signals applied to conductor 48 are blocked from conductor 53. Similarly, a negative signal on conductor 49 is blocked when a zero potential appears at conductors 62′ and 64′ simultaneously. Any other combination of signals on conductors 61′ through 64′ and conductors 48 and 49 produces a negative pulse at conductor 53 of a duration equivalent to the existence of an error. For example, if tap switch 81, shown in FIG. 1, is operating, a zero voltage apppears at conductors 62′ and 63′ in a manner to be hereinafter described. Therefore, if a negative signal is applied to conductor 49, it is coupled to conductor 53 through diode 172 whereas a negative signal on conductor 48 is coupled to conductor 53 through diode 175. Therefore, a pulse is produced if the voltage variation of the line conductors varies either above or below the reference level when tap switch 81 is operating.

Figures 5, 6:
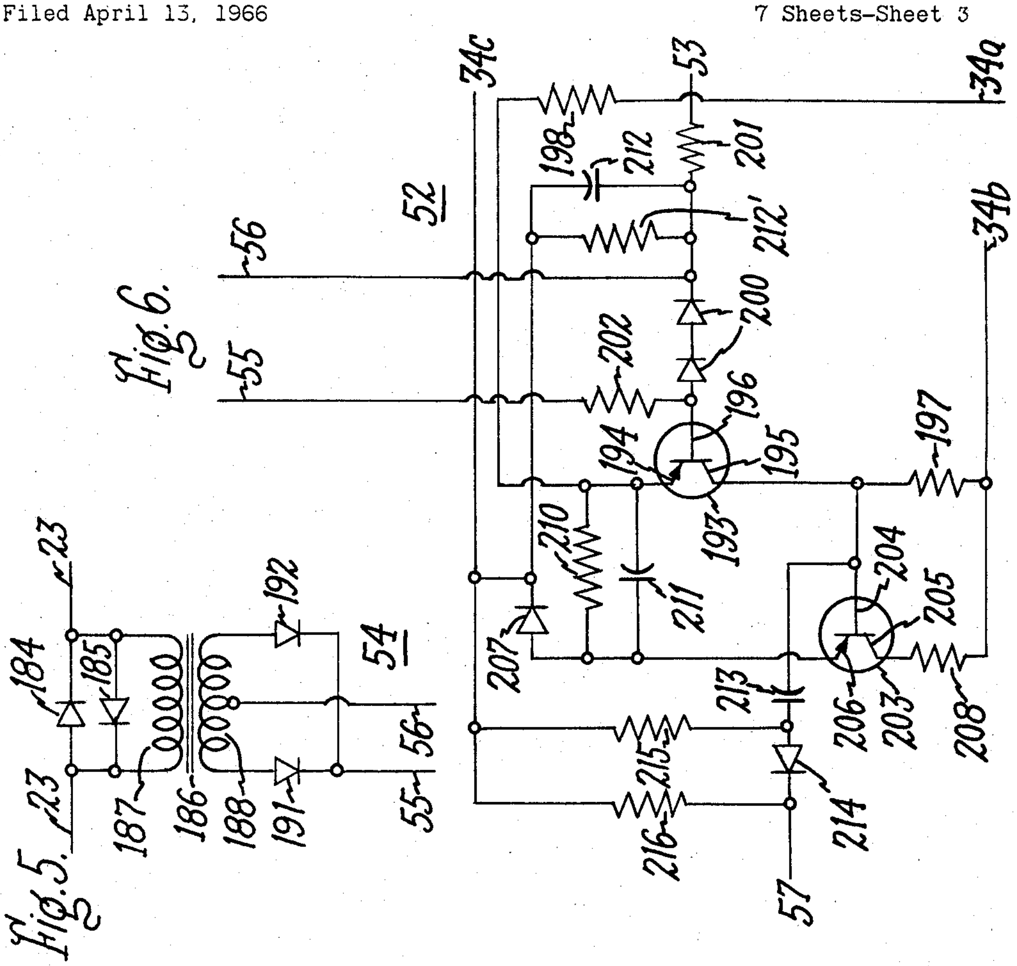
FIGURE 5 illustrates a zero current sensor which can be used effectively in a self-regulating transformer as shown herein to indicate zero current in the static switches.
FIGURE 6 illustrates a pulse generator which produces a pulse in response to a signal from the input diode matrix circuit shown in FIG. 4 and the zero current sensor shown in FIG. 5 to initiate corrective action.

*Zero current sensor 54—FIG. 5*

In order that pulse generator 52 only produce an output pulse on conductor 57 when the current passing through one of the tap switches is zero, zero current sensor 54 is connected in series with the primary. This sensor generally comprises two diodes 184 and 185 which are back-to-back and in series with the primary, represented by conductor 23. An isolation transformer 186 has a primary 187 across the diodes. Secondary 188 then serves to couple a signal to conductors 55 and 56 which are connected to pulse generator 52. Conductor 55 conducts a positive signal because it is connected to the positive terminal of a full-wave center-tapped rectifier circuit including diodes 191 and 192 which is energized by secondary 188.

For substantially the duration of a current half-cycle, either diode 184 or 185 conducts so that the voltage across primary 187 remains constant at the forward voltage drop of the conducting diode. However, as the current approaches zero, the forward voltage drop, which is a function of the current magnitude only, approaches the forward breakdown voltage of the conducting diode. When the forward voltage drop reaches the forward breakdown voltage, subsequent current decrease causes the conducting diode to cease conduction, and all the tap switch current passes through primary 187. As the minimum current to sustain diode conduction is substantially zero, a pulse produced when the diode ceases to conduct defines the zero current point with extreme accuracy. For example, if a diode has a forward current capability of five amperes RMS and a minimum current to sustain conduction of less than 0.1 ampere, a pulse would be produced at a zero point with a maximum error or less than 1°, and the current would be less than 0.125 ampere. Further, as the minimum current generally listed for silicon rectifiers is generally less than 0.1 ampere notwithstanding the current rating, the error decreases as the magnitude of the tap current increases.

*Pulse generator 52—FIG. 6*

Signals from zero current sensor 54 and input diode matrix 51 are fed into a PNP transistor 193 along with pulses from zero current sensor 54 as shown in FIG. 6 which illustrates a pulse generator 52. Transistor 193 includes an emitter 194, a collector 195 and a base 196. Collector 195 is coupled to the (−E) bias source terminal 34*b* by a resistor 197; emitter 194, to the (+E) bias source terminal 34*a* by resistor 198; and base 196, through a pair of similarly poled diodes 200 and a resistor 201 to conductor 53. Pulses from zero current sensor are applied across diodes 200 by connecting conductor 55 to a junction formed by base 196 and the anode electrode of one of the diodes 200 through a resistor 202. Conductor 56 is directly connected to the junction of a cathode terminal of the other of the diodes 200 and resistor 201.

A PNP transistor 203 has a base 204 connected directly to collector 195, a collector 205, and an emitter 206, emitter 206 being connected to the zero bias source terminal 34*c* by a diode 207 having its anode connected to emitter 206. Collector 205 is biased by a resistor 208 in series with the (−E) bias source terminal 34*b*. A resistor 210 and a capacitor 211 in parallel interconnect emitter 206 and emitter 194, and another capacitor 212 isolates the zero bias source terminal 34*c* from conductor 56. Output pulses produced at base 204 are transferred to conductor 57 by a capacitor 213, a diode 214 and resistors 215 and 216, which individually connect the zero bias source terminal 34*c* to both electrodes of diode 214.

In operation the circuit values are chosen so that only transistor 203 is normally conducting even though a positive going pulse from zero current sensor 54 is applied across diodes 200 each half-cycle. If, however, a negative signal appears at conductor 53, capacitor 212 charges at a rate determined by its value and that of resistor 201; the time constant is generally long in comparison to the time between pulses from zero current sensor 54. Until capacitor 212 charges to a potential which is slightly more negative than that at emitter 194, transistor 193 does not conduct. However, when the voltage on capacior 212 goes slightly more negative than that on emitter 194, a pulse from zero current sensor 54 causes the base-emitter diode of transistor 193 to be forward biased so that transistor 193 conducts. Collector 195, which had been at a negative bias, suddenly jumps to a slightly positive voltage as determined by the voltage across resistors 197 and 198 and the collector-emitter of transistor 193 during conduction. This positive voltage jump, or pulse, is then coupled from collector 195 through capacitor 213 and diode 214 to conductor 57 as an output pulse.

Simultaneously with the conduction of transistor 193, capacitor 211, which was charged during conduction of transistor 203, forces emitter 206 to a voltage which is negative with respect to base 204 so that transistor 203 is commutated off. During this same interval, capacitor 212 discharges through the base-emitter diode of transistor 193, resistor 198 and the bias supply 34 so that the base-emitter diode of transistor 193 is again effectively blocked. Therefore, when the next pulse is applied by zero current sensor 54 to diodes 200, no conduction of transistor 193 occurs.

In many instances a transient may cause an error to be sensed which does not need to be corrected. By using a long time delay before capacitor 212 charges sufficiently to trigger transistor 193 on, the error signal at conductor 53 must persist for that time constant. Transients do not persist for long time constant and therefore will not trigger a switching operation. When transients do occur, capacitor 212 must be discharged or transient charges could accumulate on capacitor 212 to give a false correction. In this circuit, transient charges are dissipated through a bleeder resistor 212' placed in parallel with capacitor 212 to insure the proper discharge thereof. In addition, the use of the time delay insures that other signals in the circuit have properly biased subsequent circuits in the system to insure that the proper corrective action is taken.

Figure 7:
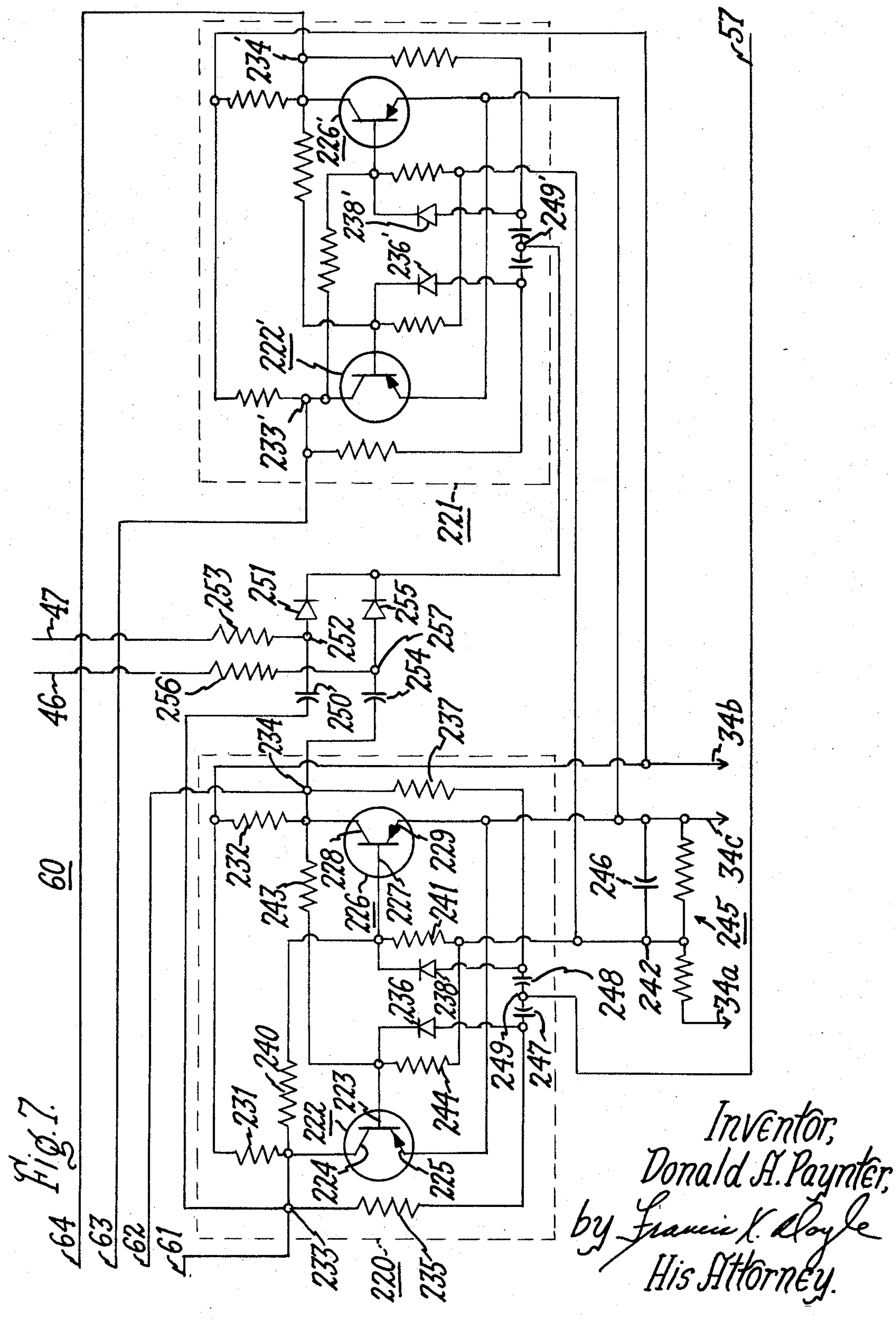
FIGURE 7 illustrates a reversible counter which can be utilized in such a regulating transformer and which produces a plurality of outputs dependent upon the inputs therto.

*Reversible counter 60—FIG. 7*

Reversible counter 60, shown in FIG. 7, comprises two bistable multivibrators or flip-flops 220 and 221. Input pulses coupled from pulse generator 52 by conductor 57 change the electrical state of the flip-flops in a forward or a reverse sequence as determined by the polarity of the bipolar signal coupled from the DC amplifier portion of amplifier and correction flip-flop 45. The state of the flip-flops is then transmitted as a combination of signals at two potential levels in one of four combinations by conductors 61, 62, 63 and 64 to output diode matrix 65.

As both flip-flops are identical, only flip-flop 220 is discussed in detail herein. Flip-flop 220 comprises an NPN transistor 222 with a base 223, collector 224 and emitter 225 and an NPN transistor 226 with base 227, collector 228 and emitter 229. Emitters 225 and 229 are connected to the zero bias source erminal 34c while collectors 224 and 228 are connected to the (−E) bias source terminal 34b by series resistors 231 and 232 respectively. In addition, collector 224 is directly connected to output terminal 233 and collector 228 is directly coupled to output terminal 234. Output terminal 233 also serves to couple collector 224 to a series resistor 235 and a diode 236 poled to conduct from collector 224 to base 223. A similar circuit comprising resistor 237 and diode 238 couples collector 228 to base 227. Additional biasing is provided by resistors 240 and 241 which constitute a voltage divider connected between collector 224 and a terminal of slightly positive voltage 242 and connected to base 227. Another voltage divider is formed by resistors 243 and 244 and is connected to collector 228, base 223 and terminal 242. Bias for terminal 242 is supplied by a tap on a voltage divider 245 connected between the (+E) and zero bias source terminals 34a and 34c and a capacitor 246 connected between zero bias source terminal 34c and terminal 242. Capacitors 247 and 248, connected between conductor 57 and diodes 236 and 238, couple input pulses to bases 223 and 227.

When transistor 222 conducts, its base 223, collector 224 and emitter 225 are all at a substantially zero potential with resistor 235 and diode 236 clamping transistor 222 on. During this period transistor 226 is off so that its collector 228 is at (−E) potential, its emitter 229 is at zero potential and its base 227 at substanially zero or slighly positive with respect to zero to block the emitter-base diode. If a positive pulse is applied to conductor 57, the emitter-base diode of transistor 222 is blocked and transistor 226 is driven into conduction. Transistor 226 is turned on when the voltage at collector 224 goes to substantially (−E) and causes the base 227 to go negative with respect to the zero voltage impressed on emitter 229 as a result of the voltage division produced by resistors 240 and 241. Once transistor 226 is turned on, it is clamped on by resistor 237 and diode 238. Hence, it can be seen that whereas with transistor 222 conducting, output terminal 233 was at zero potential and output 234 was at substantially (−E) voltage, the application of a pulse to input terminal 249 causes a reversal of the signals with output terminal 233 assuming a substantially (−E) potential and output terminal 234 assuming a substantially zero potential.

Output terminals 233 and 234 of flip-flop 220 are connected to conductors 61 and 62 respectively. In addition, they are connected through a diode switching network to an input terminal 249' of flip-flop 221. More particularly, output terminal 233 is connected to input terminal 249' by capacitor 250 and diode 251 poled to conduct positive pulses to input terminal 249' and connected thereto. A junction 252 formed by capacitor 250 and anode of diode 251 is connected to conductor 47 by resistor 253; a similar circuit comprising a capacitor 254, a diode 255 and a resistor 256 couples terminal 234, input terminal 249' and conductor 46 to a junction 257.

In order to clearly understand the operation of reversible counter 60, certain elements of flip-flop 221 will be referred to during the following discussion; however, as all the parts of flip-flop 221 are equivalent to those of 220, similar numerals are assigned to similar components, but are designated with a prime ('). Assume that both transistors 222 and 222' are conducting at a given time. When an error causes the appearance of a zero voltage at conductor 46, a negative signal at conductor 47 and a positive going pulse at conductor 57, the electrical state of flip-flop 220 changes thereby driving terminal 233 to (−E) and terminal 234 to zero. This change is seen as a negative going pulse at junction 252 and a positive going pulse at junction 257. As conductor 46 is at zero voltage, diode 255 conducts and the positive pulse from output terminal 234 is coupled to input terminal 249' to thereby change the state of flip-flop 221 causing terminal 233' to go to (−E) and terminal 234' to go to zero. If, on the other hand, the pulse on conductor 57 were applied with terminal 47 at zero and terminal 46 negative and with transistors 222 and 222' conducting, then again, terminal 233 would go to (−E) and terminal 234 would go to zero. However, the positive going pulse at output terminal 234 would not be coupled to input 249' because the negative signal on conductor 46 would reverse bias diode 255. Similarly, the negative signal applied to junction 252 would not be transmitted through diode 251. Therefore, the state at output terminals 233' and 234' would remain unchanged. Therefore, it can be seen that two different states have resulted from a single pulse being applied to conductor 57 which has been determined by the polarity of the bipolar signal applied to conductors 46 and 47. Each of these electrical states is sensed by the conductors 61, 62, 63 and 64 connected to output terminals 233, 234, 233' and 234' respectively and to output diode matrix 65.

*Output diode matrix 65—FIG. 8*

Output diode matrix 65, shown in FIG. 8, serves to interpret the binary count supplied by conductors 61 through 64 from reversible counter 60 to a single signal in terms of energization of individual output wires 70 through 73. One of the output conductors 70 through 73 is thereby energized in response to one of the four possible output signal combinations produced by reversible counter 60. Each of conductors 70 through 73 are connected directly to the (−E) bias source terminal 34*b* by means of a single series resistor 259 in series therewith and a plurality of series resistors 260, 261, 262 and 263 in series respectively with conductors 70 through 73. A plurality of diodes selectively connect conductors 61 through 64 to conductors 70 through 73. For example, the anodes of diodes 264 and 265 are connected to conductor 61 while the cathode of diode 264 is connected to conductor 73 and diode 265 has its cathode connected to conductor 71. Diodes 266 and 267 are similarly connected between conductor 62 and conductors 72 and 70. Diodes 268 and 269 couple conductor 63 to conductors 72 and 73 while diodes 270 and 271 couple conductor 64 to conductors 70 and 71.

Translation of the binary information from reversible counter 60 is produced when zero and (−E) potentials are applied to conductors 61 through 64. For example, if conductors 61 and 63 are at (−E) and conductors 62 and 64 are at substantially zero bias, then diodes 266, 267, 270 and 271 are all forward biased and conductors 70, 71 and 72 are at a substantially zero potential; only conductor 73 remains at a potential of (−E). Similar analysis shows that for any one of the four possible combinations of positive and negative signals transmitted from reversible counter 60, only one of the four output conductors assumes a negative potential while the others will assume a substantially zero potential.

*Switch driver units—FIG. 9*

The switch driver 66 is shown in detail in FIG. 9 to illustrate how signals from output diode matrix 65 are applied to conductor pairs 74 through 77 to select a tap to be switched into the circuit. The device basically comprises four driver units 280 through 283 which drive tap switches 80 through 83 as shown in FIG. 1, and a square wave power oscillator 284. As each switch driver unit is identical, only switch driver unit 281, associated with tap switch 81 which has been assumed to be closed, is described in detail.

Each switch driver unit is energized by a direct current to alternating current converter or square power oscillator 284 shown as comprising a center-tapped reactor 285 wound on a core exhibiting a rectangular hysteresis characteristic, two PNP transistors 286 and 287 having emitters connected to additional taps on reactor 285, having bases resistively coupled to reactor 285 and having collectors directly connected to the (−E) bias supply. Zero bias is supplied to the center tap of reactor 285. As is known in the art, transistors 286 and 287 alternately conduct when DC is applied to reactor 285 to produce a square wave alternating current at conductors 288 and 289 connected through the collectors of transistors 286 and 287. The frequency of the repetition rate of the square wave is determined primarily by the circuit parameters.

Switch driver 281 comprises a transformer 290 designed to operate at the frequency of the applied power from the power oscillator 284 and includes a center-tapped primary 291 and a center-tapped secondary 292. Primary 291 is connected to conductors 288 and 289 by diodes 293 and 294 to couple the power oscillator 284 to primary 291. The center tap of primary 291 is connected to a switching PNP transistor 295 through its collector 296 and then through its emitter 297 to the zero bias source terminal 34*c* to complete the primary circuit. Base 298 is coupled to the output diode matrix 65 by being connected to conductor 71. When transistor 295 is not conducting, it acts as an open circuit in the center tap return of primary 291 so that transformer 290 is not energized. However, if a (−E) signal appears at base 298, transistor 295 does conduct to complete the center tap return.

Each secondary 292 is connected to an output conductor pair such as 75 by means of a full-wave center-tapped rectifier network energized by secondary 292. Conductor 75*a* is connected to the center tap of secondary 292 while a resistor 299 connects conductor 75*b* to the common anode terminal of diodes 300. When transformer 290 is energized, an output is produced across conductors 75*a* and 75*b* whereby conductor 75*a* is positive with respect to conductor 75*b*.

This circuit provides power amplification which is required to enable the relatively low power signals from output diode matrix 65 to operate the tap switches. Transformer 290 serves to isolate conductor pair 75 from conductor 71, and the output frequency of power oscillator 284 determines the speed of response of the tap switches.

*Tap switch—FIG. 10*

A tap switch 81 is shown in FIG. 10 as being representative of a means of interconnecting taps on the main transformer primaries 13 and 14 shown in FIG. 1. The tap switch is designed to open or close an AC circuit in response to a DC control signal to thereby interconnect or open circuit a particular set of taps.

In this particular embodiment, a solid state switching means is constituted by a full-wave bridge rectifier formed by diodes 301, 302, 303 and 304 with diodes 301 and 302 having their anodes connected to a junction 305 while diodes 303 and 304 have their cathodes connected to a junction 306. Diodes 301 and 303 are connected in series as are diodes 302 and 304 to form junctions 307 and 308 at their respective cathode-anode junctions. In FIG. 10, conductor 86 from a tap on one of the main transformer primaries is connected to junction 308 while conductor 85 couples junction 307 to a tap on the other main transformer primary. A PNP transistor 310 couples junction 305 to junction 306 with its collector 311 being connected to junction 305 and its emitter 312 being coupled to junction 306.

Signals from a driver switch unit are applied to the base-emitter diode of transistor 310 by conductor 75*a* connected to emitter 312 and conductor 75*b* connected to base 313. In order to insure that transistor 310 does not conduct when no signal appears at conductors 75*a* and 75*b*, a resistor 314 is connected to base 313 and to the cathodes of diodes 315 and 316 which have their anodes respectively connected to junctions 307 and 308. In this manner, a reverse bias is applied to base 313 when no signal appears.

When a signal is applied from the switch driver unit associated with the particular tap switch, transistor 310 conducts to complete the bridge rectifier circuit. During half-cycles when conductor 86 is positive with respect to conductor 85, current flow is from conductor 86 through diode 304, transistor 310, diode 301 to conductor 85. Similarly, during opposite half-cycles current flow is from conductor 85 through diode 303, transistor 310 and diode 302 to conductor 86. So long as a signal appears from an associated switch driver unit, the tap switch is closed to interconnect two taps on the transformer to set a particular voltage level.

*Circuit operation example*

Now referring to the entire circuit shown in FIGS. 1 through 10 and to FIG. 11, operation of a tap switching sequence can be understood. Assuming that tap switch 81 is in use, it can be seen that conductors 61 and 64 to the output diode matrix 65 must be at (−E) potential and that conductors 62 and 63 must be at zero potential. To provide this input to the output diode matrix 65, reversible counter 60 is in a state such that transistors 222 and 226′ are nonconducting. If the voltage at secondary 15 goes above the acceptable regulation, a positive output voltage appears at conductor 44 to cause direct current amplifier and correction flip-flop circuit 45 to assume a state such that conductor 49 is at (−E) potential while the bipolar signal appears as a (—E) potential at conductor 46 and a zero potential at conductor 47.

The zero potential on conductors 62 and 63 are also applied to input diode matrix 51 by conductors 62' and 63'; this combination of signals permits a (—E) signal to be coupled to pulse generator 52 so that pulse generator 52 can produce an output pulse on conductor 57. Application of a pulse causes flip-flop 220 to change states such that transistor 226 becomes nonconducting so that the (—E) potential shifts from conductor 61 to conductor 62. Simultaneously, a positive pulse caused when transistor 222 becomes conducting is transferred to junction 252. As a zero potential appears at junction 252, a change in state occurs in flip-flop 221, and transistor 222' becomes nonconducting. This causes the (—E) signal on conductor 64 to shift to conductor 63; and output conductor 72 assumes a (—E) potential thereby closing tap switch 82 and increasing the number of turns in the primary. It will be noted at this time, that with conductors 61' and 64' being at zero potential, a subsequent positive signal at conductor 49 still is coupled through input diode matrix 51 to conductor 53.

Now assuming that tap 81 is closed and a signal indicative of low secondary voltage appears causing conductor 43 to become positive, the potentials on the correction flip-flop circuit 45 change so that conductor 48 is at (—E) potential and the bipolar signal appears as a zero potential at conductor 46 and a (—E) potential at conductor 47. Again, the negative potential can be conducted through input diode matrix 51 to conductor 53 and applied to pulse generator 52. During one of the pulses from zero current sensor 54, a pulse is coupled to reversible counter 60 by conductor 57 again causing flip-flop 220 to change states so that transistor 226 is nonconducting. As conductor 47 is now at (—E) potential, the positive going pulse caused when transistor 222 turns on cannot be transmitted to flip-flop 221; and transistor 226' remains nonconducting. This change causes the negative potentials to appear at conductors 62 and 64, and the negative output signal from output diode matrix 65 appears at conductor 70 to close tap 80.

If the secondary voltage is still low after tap switch 80 is closed, no additional correction can occur. With tap switch 80 closed zero potentials are applied to input diode matrix 51 by conductors 61' and 63'. This bias pattern blocks negative signals on conductor 48 which are indicative of low secondary voltage. If the error were to reverse, however, a negative signal would be coupled through input diode matrix 51 from conductor 49.

Briefly summarizing, the tap changing system described above regulates transformer output voltage. Means are provided to produce a reference voltage and a voltage indicative of the secondary voltage and to compare these voltages to produce an output voltage which is converted into two signals. A first signal is applied to a circuit which senses the count on the reversible counter so as to prevent an advance of the counter in either direction when the counter limit has been obtained. If the counter limit has not been obtained, an input signal is provided to a pulse generator which produces a pulse simultaneously with a zero current in the tap switching elements. Zero sensing is accomplished by a pair of back-to-back diodes in parallel with a transformer secondary so that the transformer secondary only conducts at substantially zero current to provide an accurate indication of zero current. When a pulse is produced by the pulse generator, it is coupled through the reversible counter and a network to transform and amplify the counter output to change the tap in the proper direction to either increase or decrease the voltage as sensed by the voltage sensor circuit. The direction of the count is controlled by the second signal obtained by converting the output voltage.

Although the present invention has been described with reference to particular circuits for particular purposes, various modifications may be made by those skilled in the art without actually departing from the spirit and scope of the invention. The various circuits described herein are merely exemplary of many circuits and modifications which may be made in the individual circuits without departing from the system as described and claimed herein. For example, the voltage sensor could comprise any bridge system and phase detector system, or the tap switching elements could comprise any of the solid state devices such as silicon controlled rectifiers which are known in the art and which can be easily substituted for the particular circuits shown in the specification; however, such substitution would be obvious to those skilled in the art. Therefore, the appended claims are intended to cover all such equivalent variations which come within the true spirit and scope of the invention.

What is claimed as new and is desired to be secured by Letters Patent of the United States is:

1. In a transformer having a primary winding adapted for connection to an alternating current power source, a secondary winding adapted to be coupled to a load and taps on one of the windings, a tap changer connected to the taps to maintain the secondary output voltage at a predetermined voltage comprising:

(a) switching means connected to the transformer taps for selectively interconnecting the taps to vary the transformer turns ratio, (b) sensing means connected to the secondary for sensing an output voltage variation from the predetermined voltage, said sensing means producing a first signal indicating the direction of variation, (c) zero current detector means connected in series with said switching means for producing a pulse each time the current in said switching means passes through zero, and (d) switch changing means connected to said sensing means, said zero current detector means and said switching means, said switch changing means producing signals for changing said switching means in response to a signal from said sensing means and said zero current detector means when the secondary output voltage varies from the predetermined voltage, said switch changing means causing said switching means to change the tap interconnection when the current in said switching means is substantially zero.

2. A tap changer as recited in claim 1 wherein said switching means are connected to taps in the transformer primary and said zero current detector means are connected in series with the primary for sensing zero primary current.

3. A tap changer as recited in claim 1 wherein said switching means comprises a plurality of solid state switching means, each of said solid state switching means interconnecting different taps on the transformer, one of said solid state switching means being conductive at one time in response to signals from said switch changing means.

4. A tap changer as recited in claim 1 wherein said switching means comprises amplifying means connected to said switch changing means for amplifying the signal produced thereby and a tap switching circuit connected to said amplifying means and the transformer taps for interconnecting the taps, said amplifying means isolating said tap switching circuit from said switch changing means.

5. A tap changer as recited in claim 1 wherein said sensing means comprises:

(1) a sensing circuit connected to the transformer secondary for producing a signal indicative of the direction of error caused when the secondary voltage varies from the predetermined voltage, (2) bistable circuit means connected to said sensing circuit for producing a pair of signals, one of said signals being indicative of the direction of error and being produced only during duration of the error, and (3) indicating means connected to said bistable circuit means and to said switch changing means for indicating when said zero current detector means can change said switching means to permit said one signal to be coupled to said switch changing means, the other of said pair of signals being indicative of the direction of the error and being coupled to said switch changing means.

6. A tap changer as recited in claim 1 wherein said switch changing means comprises:

(1) pulse producing means connected to said sensing means and to said zero current detector means for producing an output pulse, said pulse producing means including a time delay means in series with said sensing means to delay the production of a pulse until a predetermined time interval after a signal is applied to said pulse producing means by said sensing means, said pulse producing means producing a pulse only after said predetermined time interval on the first subsequent signal from said zero current detector means, (2) reversible counter means connected to said pulse producing means and said sensing means for producing a plurality of signals, said plurality of signals being in a predetermined combination, one combination representing each of the switching means conditions, said pulse producing means causing the reversible counter means to shift from one combination to another combination in a direction indicated by the signal from said sensing means, and (3) signal translating means connected to said reversible counter means for converting said combination of signals to a single output signal, said single output signal controlling said switching means.

7. A tap changer as recited in claim 1 wherein said zero current detector means comprises:

(1) unidirectional current conducting means in series with said switching means, said unidirectional current conducting means having a substantially constant voltage drop thereacross above a minimum current and being substantially nonconducting below said minimum current, (2) conductive means connected in parallel with said unidirectional current conducting means for shunting a substantially constant current when said unidirectional current conducting means are conducting and substantially all of said current when said unidirectional current conducting means are nonconducting, (3) signal producing means coupled to said conductive means and connected to said switch changing means for producing an output signal whenever the current in said switching means goes below said minimum current.

8. A tap changer as claimed in claim 7 wherein said unidirectional current conducting means comprise two oppositely poled unidirectional breakdown devices in parallel and wherein said breakdown voltage for said breakdown devices occurs when the current therethrough is substantially equal to said minimum current so that said breakdown devices do not conduct below said minimum current.

9. A tap changer as recited in claim 7 wherein said unidirectional current conducting means comprise two rectifiers in a back-to-work relationship, said rectifiers being conductive above said minimum current and being nonconductive below said minimum current whereby substantially all of said current is shunted through said conductive means when said current in said switching means is less than said minimum current.

10. A tap changer as recited in claim 7 wherein said conductive means includes a magnetic field producing means connected in parallel with said unidirectional current conducting means, said magnetic field producing means producing a changing field whenever the current in said switching means falls below said minimum current, said changing magnetic field being coupled to said signal producing means and sensed thereby.

11. A tap changer as recited in claim 10 wherein said magnetic field producing means comprises a transformer primary and said signal producing means comprises a transformer secondary whereby only changing magnetic fields in said primary are coupled to said secondary to produce a signal.

12. A tap changer as recited in claim 10 wherein said signal producing means comprises means responsive to changing magnetic fields, said magnetic field being coupled to said changing magnetic field responsive means and conversion means connected to said changing magnetic field responsive means to convert said changing magnetic field to a useful output signal.

13. A tap changer as recited in claim 11 wherein said signal producing means additionally comprises a rectifier means connected to said secondary to be energized thereby, said rectifier producing a unidirectional voltage signal which is coupled to said switch changing means.

14. A circuit adapted to be connected in series with an alternating current carrying conductor to sense zero current in the conductor comprising:

(a) unidirectional current conducting means in series with the conductor, said unidirectional current conducting means having a substantially constant voltage drop thereacross above a predetermined minimum current and being substantially nonconducting below said minimum current, (b) conductive means connected in parallel with said unidirectional current conducting means for shunting a substantially constant current when the current in the conductor is above said minimum current and substantially all of said current when the current in the conductor is below said minimum current, (c) signal producing means coupled to said conductive means for producing an output signal whenever said current is below said minimum current, and (d) utilization means connected to said signal producing means and responsive to a signal produced thereby.

15. A zero current sensing circuit as recited in claim 14 wherein said unidirectional current conducting means includes two oppositely poled unidirectional breakdown devices connected in parallel, said unidirectional current breakdown devices being substantially nonconductive at currents below said minimum current.

16. A zero current sensing circuit as recited in claim 15 wherein said oppositely poled unidirectional breakdown devices in parallel comprise two rectifiers in a back-to-back relationship, the forward breakdown voltage for said rectifiers being exceeded when the current exceeds said minimum value.

17. A zero current sensing circuit as recited in claim 14 wherein said conductive means includes a magnetic field producing means, said magnetic field producing means being energized by a substantially constant current when the current in the conductor is above said minimum current, a changing magnetic field being produced when the current in the conductor is below said minimum current and said unidirectional current conducting means are nonconducting, said signal producing means bieng energized by said changing magnetic field.

18. A zero current sensing circuit as recited in claim 17 wherein said signal producing means comprises means responsive to changes in said magnetic field, said signal producing means being magnetically coupled to said magnetic field producing means and conversion means to convert the changing magnetic field to a useful output signal.

19. A zero current detector circuit as recited in claim 18 wherein said magnetic field producing means comprising a transformer primary connected in parallel with said unidirectional current conducting means and said signal producing means comprises a transformer secondary and rectifying means connected to said secondary for energization thereby, said utilization means being connected to said rectifying means.

References Cited

UNITED STATES PATENTS

| | | | |
|---|---|---|---|
| 2,774,038 | 12/1956 | Stavis | 324—87 |
| 3,263,157 | 7/1966 | Klein | 323—22 |
| 3,319,153 | 5/1967 | Livingston | 323—43.5 |
| 3,340,629 | 9/1967 | Ebersohl | 323—43.5 |

JOHN F. COUCH, *Primary Examiner.*

W. E. RAY, *Examiner.*

UNITED STATES PATENT OFFICE

CERTIFICATE OF CORRECTION

Patent No. 3,388,319 June 11, 1968

Donald A. Paynter

It is certified that error appears in the above identified patent and that said Letters Patent are hereby corrected as shown below:

Column 3, line 17, "therto" should read -- thereto --; line 26, "FIG. 10" should read -- FIGURE 10 --; line 30, "shown" should read -- show --. Column 4, line 2, "druing" should read -- during --; line 25, "top" should read -- tap --; line 49, "to" should read -- by --; line 68, "54" should read -- 45 --. Column 5, line 9, "cricuit" should read -- circuit --. Column 6, line 2, "Tho" should read -- The --. Column 8, line 62, "connect" should read -- connected --. Column 9, line 54, "erminal" should read -- terminal --. Column 15, line 70, "back-to-work" should read -- back-to-back --. Column 16, line 70, "bieng" should read -- being --.

Signed and sealed this 25th day of November 1969.

(SEAL)

Attest:

Edward M. Fletcher, Jr.

Attesting Officer

WILLIAM E. SCHUYLER, JR.

Commissioner of Patents